Dec. 4, 1928.  S. F. BRIGGS  1,694,247
ELECTRIC MOTOR
Filed Aug. 28, 1922   3 Sheets-Sheet 1
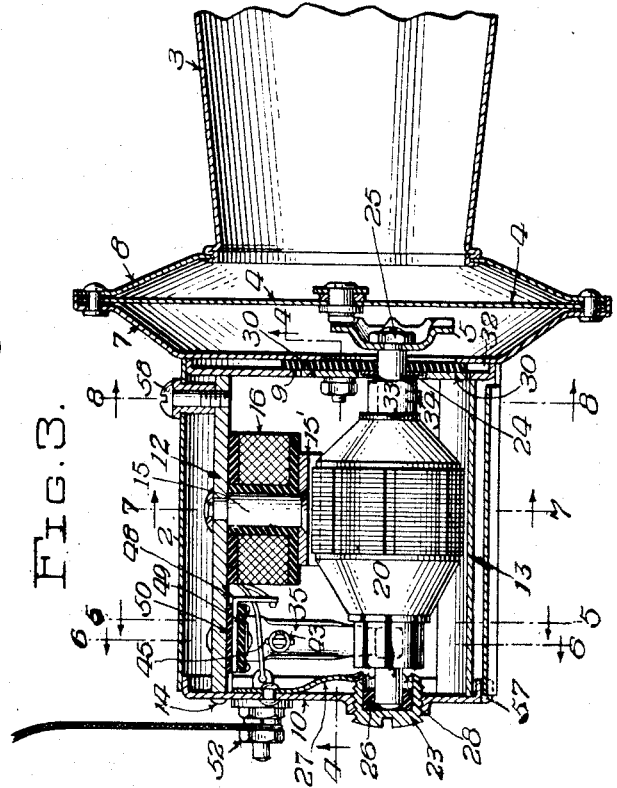
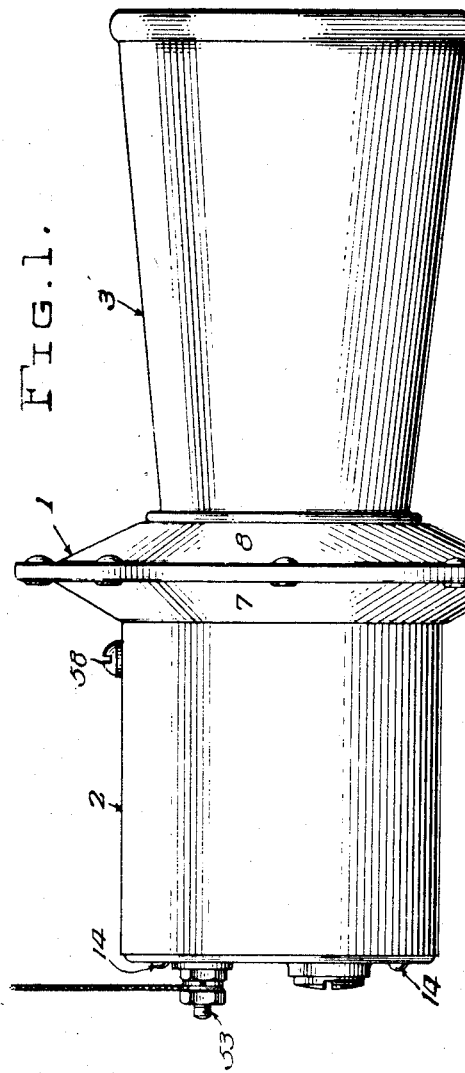
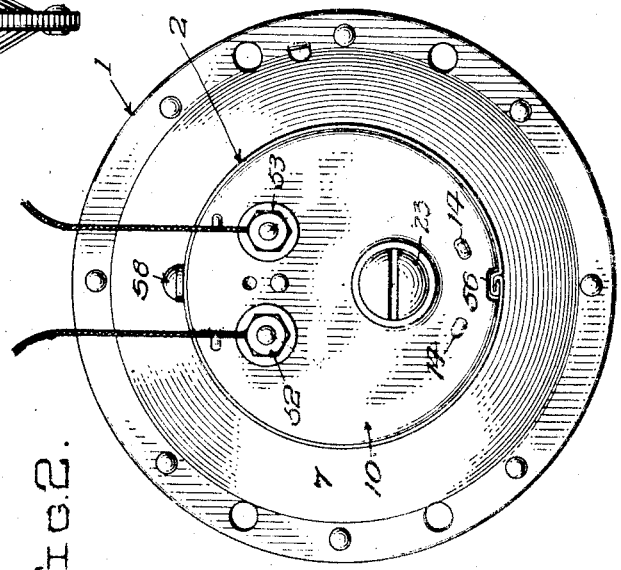
Inventor
Stephen F. Briggs Dec. 4, 1928.
S. F. BRIGGS
1,694,247
ELECTRIC MOTOR
Filed Aug. 28, 1922
3 Sheets-Sheet 2
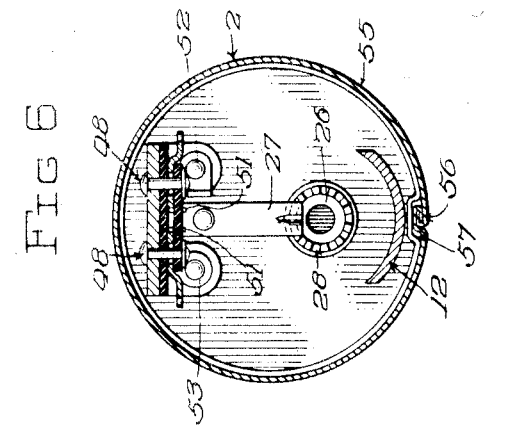
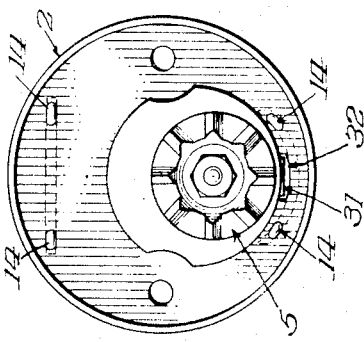
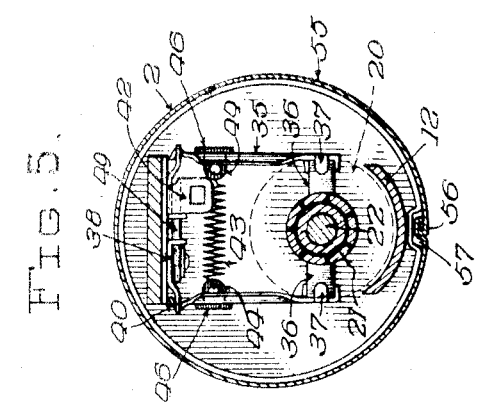
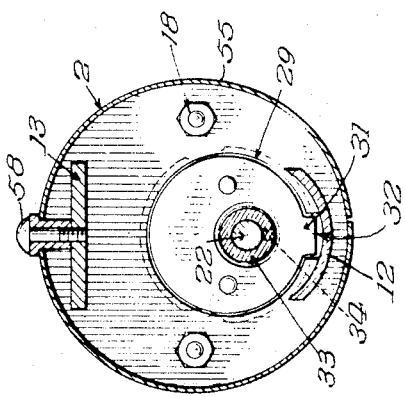
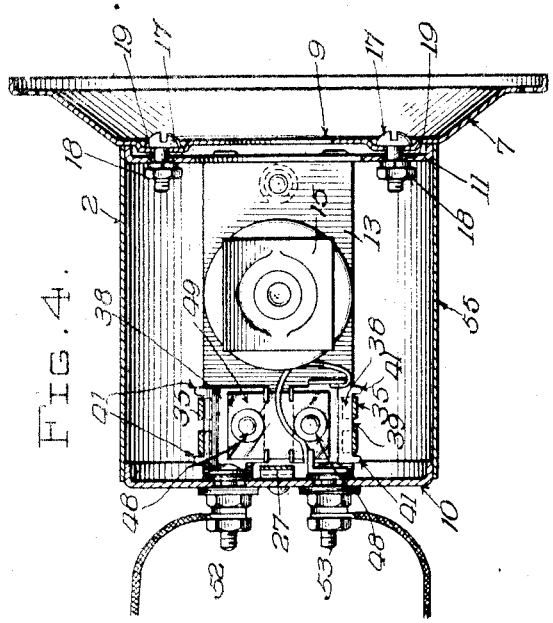
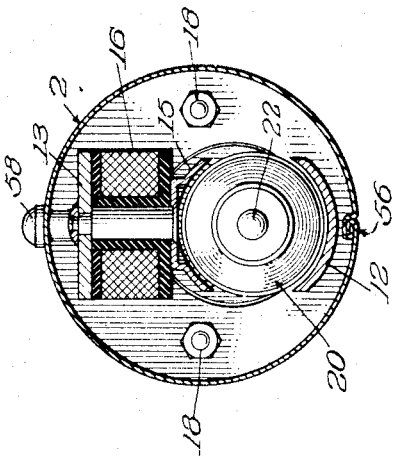
Inventor
Stephen F. Briggs
By

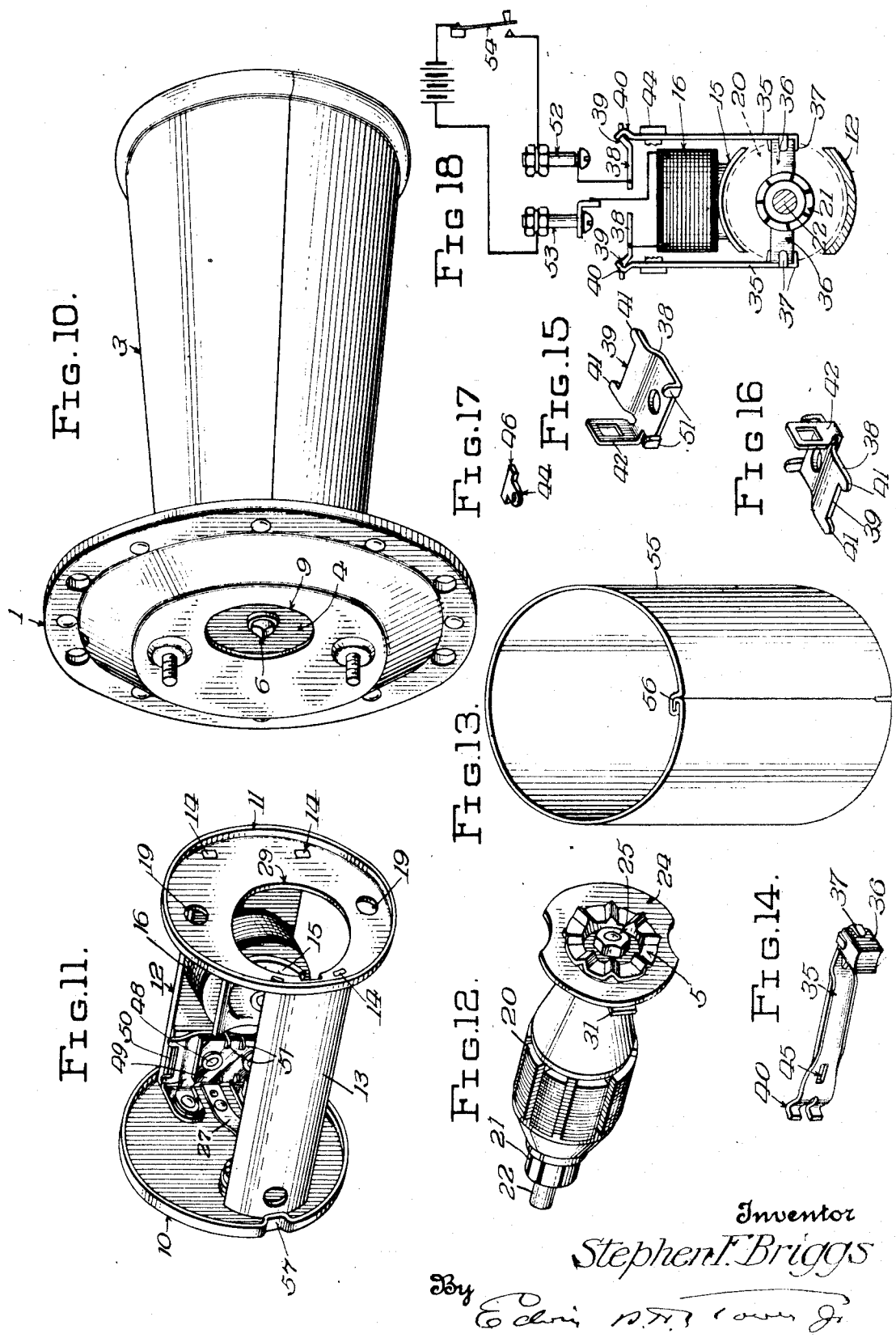

Patented Dec. 4, 1928.

1,694,247

UNITED STATES PATENT OFFICE.

STEPHEN F. BRIGGS, OF MILWAUKEE, WISCONSIN, ASSIGNOR, BY MESNE ASSIGNMENTS, TO EDWIN B. H. TOWER, JR., OF MILWAUKEE, WISCONSIN.

ELECTRIC MOTOR.

Application filed August 28, 1922. Serial No. 584,691.

This invention relates to electric motors.

It relates particularly to electric motors adapted to be employed in electric horns or for various other purposes.

An object of the invention is to provide an efficient, compact, inexpensive and readily assembled and disassembled motor.

In accordance with this invention, the motor comprises three separable units; the field frame, the armature, and the brush holders.

The motor armature has a thrust bearing and a removable bearing, and is removable from the motor endwise through the field frame.

The brush holders are each provided with an open pivotal bearing and are removable by merely being withdrawn from the bearing.

In order to more particularly set forth the invention and to illustrate one purpose for which it may be employed, the motor is shown in the accompanying drawings as being used with an electric horn.

The views of the drawings are as follows:

Fig. 1 is an elevation of a horn and a motor used therewith.

Fig. 2 is a rear end view thereof.

Fig. 3 is a longitudinal section thereof leaving the armature of the motor in elevation.

Fig. 4 is a sectional view on line 4—4 of Fig. 3 toward the face of the main pole.

Fig. 5 is a sectional view on line 5—5 of Fig. 3.

Fig. 6 is a sectional view on line 6—6 of Fig. 3.

Fig. 7 is a sectional view on line 7—7 of Fig. 3.

Fig. 8 is a sectional view on line 8—8 of Fig. 3.

Fig. 9 is a front end view of the motor.

Fig. 10 is a perspective of the sound box and resonator of the horn.

Fig. 11 is a perspective view of the motor frame.

Fig. 12 is a perspective view of the motor armature.

Fig. 13 is a perspective view of the motor casing.

Fig. 14 is a perspective view of the brush holder.

Fig. 15 is a perspective view of the bracket from one side.

Fig. 16 is a perspective view of the bracket from the other side.

Fig. 17 is a perspective view of the insulating connecting lug.

Fig. 18 is a circuit diagram showing the motor schematically.

Motor.

The motor 2 comprises in general a field frame, an armature, bearings for the armature shaft, brush holders, commutator, and a motor cover or casing.

The field frame has a field core 15 projecting inward from the side plate 13, a main pole 15' thereon and a winding 16 therefor.

The side plate 12 forms the opposite pole and is magnetically connected to the main pole through the field frame.

The field magnetism flows from the main pole through the field frame to the opposite pole and thence back to the main pole.

The motor is shown as mounted centrally upon the sound box of a horn and fastened thereto by bolts 17 provided with nuts 18, these bolts being fastened to the back casing plate 7 and passing through holes 19 therefor in the end field plate 11. The motor may, of course, be mounted upon and used with various other devices.

The armature 20 and its commutator 21 are mounted upon a shaft 22 between the field poles, it being located eccentrically within the motor or field frame.

The armature shaft has a thrust bearing 23 at one end and a removable bearing 24 at the other end.

The end thrust bearing 23 is threaded into the rear field plate 10 and has therein a bearing ring 26 in which the shaft rotates.

In order to keep the thrust bearing from accidentally turning, it is held by a spring pawl 27 which engages serrations 28 in the end thereof.

The removable bearing 24 is formed by a circular bearing plate in which the shaft rotates.

This bearing plate may be held between the field frame and the sound box and arranged between the actuator and the armature.

The motor or field frame has an eccentric opening 29 therein through which the armature may be passed end-wise or axially to remove it from the field frame or place it therein.

The removable bearing plate is kept from moving laterally and turning by a metal plate 30 which is fastened thereto and fits within the opening 29 and has a lug 31 which enters a notch 32.

The armature shaft is provided with a collar 33 located between the removable bearing plate and the armature and provided with a set screw 34, this collar serving to limit the armature shaft in its forward end-wise movement.

The armature shaft may be adjusted longitudinally by turning the adjustable thrust bearing.

The two brush holders 35 are alike, so only one thereof will be described.

The brush holder carries at one end a brush 36 for the commutator and has at its other end an open pivotal bearing from which it may be removed by merely being withdrawn therefrom.

The brush is held in position by lugs 37 to which it may be soldered.

The open pivotal bearing is formed by a bracket 38 which has a pivot edge 39.

The brush holder bears and pivots upon the pivot edge and has a groove 40 to receive this pivot edge.

The open pivotal bearing may be formed in various other ways, the purpose being to provide a pivotal bearing from which the brush holder may be removed by simply withdrawing it therefrom.

The bracket has lugs 41 at the ends of the pivot edge to keep the brush holder from moving sidewise, and the pivot edge entering the groove keeps the brush holder from turning laterally.

The bracket is provided with a terminal 42 for making electrical connection thereto.

The brush holder is connected to a helical or coiled spring 43 by an insulating lug 44, this lug being located in a slot 45 in the brush holder and provided with a head 46 to fasten it to the brush holder.

The spring draws the brush holders towards each other and thereby keeps them in position upon the brackets and causes the brushes to press upon the commutator.

The two brackets are fastened upon the side plate 12 by rivets 48 and insulated from this plate and each other by insulating plates 49 and 50.

The brackets have upstanding lugs 51 which enter slots in the insulating plate 49 to keep them from turning.

The motor is electrically connected to the source of current through two insulated binding posts 52 and 53 which are mounted upon the end plate 10.

The binding post 52 is electrically connected to one terminal of the field coil, and the binding post 53 is electrically connected to one bracket, the other bracket being electrically connected to the other terminal of the field winding.

The motor circuit is shown in Fig. 18, and when the switch 54 is closed current flows from the positive battery terminal through binding post 53, field coil 16, bracket 38, brush holder 35, brush 36, armature 20, brush 36, brush holder 35, bracket 38, binding post 52, switch 54, back to the battery.

The motor is provided with a cover 55 which is preferably made from metal sheet bent into cylindrical form and having the ends thereof hooked together.

These hooked ends form a longitudinal rib 56 upon the inside of the cover.

The cover fits over the field frame end plates, and the longitudinal rib 56 enters a notch 57 therefor in the end plate 10 to keep it from turning.

The cover is fastened to the field frame by a screw 58.

The motor 2 is shown as detachably fastened to the back of a horn sound box.

This horn comprises, in general, a sound box 1, and a resonator or amplifier 3 projecting from the front thereof. The sound box has therein a diaphragm 4 which is adapted to be vibrated.

As shown, the armature shaft of the motor is utilized, in the present instance, for imparting a vibratory movement to the diaphragm.

An actuator is fastened upon the armature shaft by a nut 25, the end of the shaft being upset to prevent the nut from turning.

This actuator, which comprises a serrated wheel 5, engages a central button 6 fastened to the diaphragm of the horn.

The sound box is formed from two concave casing plates 7 and 8, the edges of which are united together and hold therebetween the edges of the diaphragm.

The front plate 8 has a central opening which communicates with the resonator and the back plate has an eccentric opening 9 through which the actuator may pass in applying and removing the motor.

The parts which form the horn are mainly made from stamped metal.

It is, of course, to be understood that the motor, although shown as applied to a horn, may be used for various other purposes.

As previously pointed out, the motor comprises a field frame, an armature, the brush holders, and the motor cover or casing, each of which is a unit that may be readily removed for the purpose of being repaired or replaced.

These units are of such form that they are durable, practical and capable of being easily and cheaply manufactured.

Of course, various modifications and adaptations may be made in the motor, within the purview of the claims, without departing from the invention.

The invention is hereby claimed as follows:

1. An electric motor comprising a field frame having side plates to provide and support opposite poles and end plates to connect said side plates, an energizing winding for said field frame, an armature arranged between said side plates and removable endwise through an opening therefor in one of said end plates, and a removable bearing plate arranged across said opening to support said armature.

2. An electric motor comprising a field frame having a side plate to support a main pole and another side plate to provide an opposite pole and end plates to connect said side plates, one of said end plates having an opening through which the armature may be removed end wise, a pole piece attached to one of said side plates, an energizing winding arranged on said pole piece, an armature arranged within said field frame between said pole piece and one of said side plates and removable endwise through said opening, and a removable bearing plate arranged across said opening and having a bearing for said armature.

3. An electric motor comprising a field frame having a side plate to support a main pole and another side plate to provide an opposite pole and end plates to connect said side plates, one of said end plates having an opening through which the armature may be removed end wise, a pole piece attached to one of said side plates, an energizing winding arranged on said pole piece, an armature arranged within said field frame between said pole piece and one of said side plates and removable endwise through said opening, a removable bearing plate arranged across said opening and having a bearing for said armature, and commutator brushes carried by one of said side plates.

4. An electric motor comprising a field frame having a side plate to support a main pole and another side plate to provide an opposite pole and end plates to connect said side plates, an energizing winding for said field frame, an armature arranged within said field frame between said side plates and having bearings arranged in said end plates, and commutator brushes pivoted on bearings carried by said frame and held in place upon said bearings by a spring arranged between the same.

In witness whereof, I have hereunto subscribed my name.

STEPHEN F. BRIGGS.

CERTIFICATE OF CORRECTION.

Patent No. 1,694,247.    Granted December 4, 1928, to

STEPHEN F. BRIGGS.

It is hereby certified that error appears in the printed specification of the above numbered patent requiring correction as follows: Page 1, after line 66, insert the following.

The motor or field frame is formed from two circular end field plates 10 and 11 and two side field plates 12 and 13.

The side plates and the end plates are fastened together by riveted projections 14 formed upon the ends of the side plates and projecting through openings therefor in the end plates.; page 2, line 79, after the word "from" insert the article "a"; and that the said Letters Patent should be read with these corrections therein that the same may conform to the record of the case in the Patent Office.

Signed and sealed this 29th day of October, A. D. 1929.

(Seal)

M. J. Moore,
Acting Commissioner of Patents.